United States Patent
Xu et al.

(10) Patent No.: US 12,085,992 B2
(45) Date of Patent: Sep. 10, 2024

(54) SUPPORT DEVICE AND FOLDABLE DEVICE

(71) Applicant: BOE Technology Group Co., Ltd., Beijing (CN)

(72) Inventors: Linlin Xu, Beijing (CN); Yonghong Zhou, Beijing (CN); Baofeng Sun, Beijing (CN); Shangchieh Chu, Beijing (CN); Bo Wang, Beijing (CN); Yanli Wang, Beijing (CN); Wei Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 197 days.

(21) Appl. No.: 17/781,504

(22) PCT Filed: Jul. 5, 2021

(86) PCT No.: PCT/CN2021/104534
§ 371 (c)(1),
(2) Date: Jun. 1, 2022

(87) PCT Pub. No.: WO2022/037286
PCT Pub. Date: Feb. 24, 2022

(65) Prior Publication Data
US 2023/0004192 A1    Jan. 5, 2023

(30) Foreign Application Priority Data
Aug. 17, 2020   (CN) .......................... 202010824603.9

(51) Int. Cl.
*G06F 1/16*   (2006.01)

(52) U.S. Cl.
CPC .......... *G06F 1/1656* (2013.01); *G06F 1/1616* (2013.01); *G06F 1/1652* (2013.01); *G06F 1/1681* (2013.01)

(58) Field of Classification Search
CPC .... G06F 1/1656; G06F 1/1616; G06F 1/1652; G06F 1/1681
See application file for complete search history.

(56) References Cited

U.S. PATENT DOCUMENTS

| 10,345,858 B2* | 7/2019 | Han | ...................... G06F 1/1652 |
| 10,416,726 B2* | 9/2019 | Lin | ...................... H04B 1/3888 |

(Continued)

FOREIGN PATENT DOCUMENTS

| CN | 105407194 A | 3/2016 |
| CN | 207460248 U | 6/2018 |

(Continued)

*Primary Examiner* — Rockshana D Chowdhury
*Assistant Examiner* — Martin Antonio Asmat Uceda
(74) *Attorney, Agent, or Firm* — IPro, PLLC

(57) ABSTRACT

Provided is a support device. The support device is disposed on a back side of a bendable structure, the bendable structure including a bending portion, and a first non-bending portion and a second non-bending portion disposed on two sides of the bending portion, respectively; the support device including: a first support, configured to be connected to the first non-bending portion; a second support, configured to be connected to the second non-bending portion; a rotating shaft support, configured to be rotatably connected to the first support and the second support; and at least one support component, wherein each support component is connected to the rotating shaft support and configured to be connected to the bending portion.

12 Claims, 10 Drawing Sheets

(56) References Cited

U.S. PATENT DOCUMENTS

| | | | |
|---|---|---|---|
| 10,591,959 B1* | 3/2020 | Hsu | G09F 9/301 |
| 10,883,534 B2* | 1/2021 | Bae | G06F 1/1652 |
| 2014/0355195 A1 | 12/2014 | Kee et al. | |
| 2017/0060188 A1* | 3/2017 | Han | G06F 1/1641 |
| 2018/0146560 A1* | 5/2018 | Chen | G06F 1/1626 |
| 2018/0166809 A1* | 6/2018 | Brogan | H01R 13/2407 |
| 2018/0267574 A1 | 9/2018 | Cho et al. | |
| 2020/0281085 A1* | 9/2020 | Jia | G06F 1/1681 |

FOREIGN PATENT DOCUMENTS

| | | |
|---|---|---|
| CN | 208686793 U | 4/2019 |
| CN | 109830185 A | 5/2019 |
| CN | 110035140 A | 7/2019 |
| CN | 111911525 A | 11/2020 |
| CN | 212536421 U | 2/2021 |
| KR | 20160089164 A | 7/2016 |

\* cited by examiner

SUPPORT DEVICE AND FOLDABLE DEVICE

CROSS-REFERENCE TO RELATED APPLICATIONS

This application is a U.S. national stage of international application No. PCT/CN2021/104534, filed on Jul. 5, 2021, which claims priority to Chinese Patent Application No. 202010824603.9, filed on Aug. 17, 2020 and entitled "SUPPORT DEVICE AND FOLDABLE DEVICE", the contents of which are herein incorporated by references in their entireties.

TECHNICAL FIELD

The present disclosure relates to the field of machinery technologies, and in particular relates to a support device and a foldable device.

BACKGROUND

With the development of science and technology, flexible display substrates are widely applied in foldable display devices due to their good bending performances.

SUMMARY

Embodiments of the present disclosure provide a support device and a foldable device. The technical solutions are as follows.

In an aspect, a support device is provided. The support device is disposed on a back side of a bendable structure, the bendable structure includes a bending portion, and a first non-bending portion and a second non-bending portion disposed on two sides of the bending portion, respectively. The support device includes:

a first support, configured to be connected to the first non-bending portion;

a second support, configured to be connected to the second non-bending portion;

a rotating shaft support, configured to be rotatable connected to the first support and the second support; and at least one support component, wherein each support component is connected to the rotating shaft support and configured to be connected to the bending portion.

Optionally, the rotating shaft support includes a strip-shaped support beam and a strip-shaped rotating shaft; wherein the support beam is provided with a rotating shaft hole penetrating through the support beam, wherein an axis of the rotating shaft hole is parallel to an extending direction of the support beam; and the rotating shaft is disposed in the rotating shaft hole and is rotatable in the rotating shaft hole.

Optionally, each support component includes a strip-shaped support bar; wherein one end of the support bar is bonded to the support beam, and the other end of the support bar is configured to be fixedly connected to the bending portion.

Optionally, the support beam is provided with at least one first groove, wherein one end of the support bar is disposed in one first groove and is bonded to the first groove.

Optionally, an orthographic projection of one end of the support bar on the support beam is within an orthographic projection of the other end of the support bar on the support beam.

Optionally, the support bar has a T-shaped cross section, and the cross section is perpendicular to an extending direction of the support bar.

Optionally, each support component includes a strip-shaped support bar and a plurality of connectors, each of the connectors being bent-shaped; wherein one end of each of the connectors is fixedly connected to the support bar, and the other end of the connector is connected to the support beam, and at least two connectors of the plurality of connectors are disposed on different sides of the support bar; and the support bar is further configured to be fixedly connected to the bending portion.

Optionally, the support beam is provided with a plurality of second grooves, and each support component further includes a first protruding structure connected to the other end of the connector, the first protruding structure being disposed in one of the second grooves.

Optionally, each support component includes a strip-shaped support bar, a sheet structure connected to a side of the support bar, and a second protruding structure at an end, distal from the support bar, of the sheet structure; and the support beam is provided with a third groove, a fourth groove, and a communication groove disposed inside the support beam and configured to communicate the third groove and the fourth groove;

wherein the support bar is disposed in the third groove, the second protruding structure is disposed in the fourth groove, and the sheet structure is disposed in the communication groove; and wherein the support bar is further configured to be fixedly connected to the bending portion.

Optionally, a length of the third groove along the extending direction of the support beam is greater than a total length of the support bar and the sheet structure along an extending direction of the support bar.

Optionally, a bottom surface of the third groove and a bottom surface of the fourth groove are both arc surfaces, and a surface, proximal to the support beam, of the support bar and a surface, proximal to the support beam, of the sheet structure are both the arc surfaces;

wherein the arc surfaces are protruded in a direction proximal to the bendable structure, and a radius of the arc surfaces is greater than a radius of the rotating shaft hole.

Optionally, the rotating shaft support further includes: a strip-shaped support structure connected to the support beam and two plate-shaped connecting structures, the two connecting structures being connected to two ends of the support structure, respectively; wherein each of the connecting structures is at least provided with a first through hole, and a second through hole and a third through hole disposed on two sides of the first through hole respectively, wherein an axis of the first through hole is co-linear with an axis of the rotating shaft hole, the first through hole is connected to the rotating shaft, the second through hole is connected to the first support, and the third through hole is connected to the second support.

Optionally, the support device further includes: a first bracket and a second bracket; wherein one end of the first bracket is rotatably connected to the rotating shaft support, and the other end of the first bracket is fixedly connected to the first support; and one end of the second bracket is rotatably connected to the rotating shaft support, and the other end of the second bracket is fixedly connected to the second support.

In another aspect, a foldable device is provided. The foldable device includes: a bendable structure, and at least one support device described in the above aspect; wherein the support device is disposed on and connected to a back side of the bendable structure.

Optionally, the bendable structure is a flexible display panel.

Optionally, the foldable device further includes: a reinforcement plate; wherein the support device and the bendable structure are connected by the reinforcement plate.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

In order to make the object, technical solutions and advantages of the present disclosure clearer, the embodiments of the present disclosure are described in detail below with reference to the accompanying drawings.

In the related art, a foldable display device includes a flexible display panel and a support device disposed on a side of the flexible display panel. The flexible display panel has a bending portion and non-bending portions disposed on two sides of the bending portion respectively. The support device may include two support parts, and each support part may be connected to one non-bending portion of the flexible display panel to support the non-bending portion.

However, the support device does not support the bending portion of the flexible display panel, and the flexible display panel has a poor rigidity. Thus, the bending portion of the flexible display panel bulges easily, resulting in a poor flatness of the flexible display panel.

In the field of display technologies, the foldable display device may be prepared by using a bendable flexible display panel, so as to meet the users' demand for large screen display and improve portability of the display device. The foldable display device is foldable and occupies a relatively small space after being folded, and thus is portable. When the foldable display device is unfolded, the region for displaying images has a relatively large area, and the display effect is good.

Generally, the flexible display panel in the foldable display device needs to be supported such that the flexible display panel has a good flatness and impact resistance, thereby ensuring the display effect of the foldable display device. However, in the related art, the support device cannot provide the bending portion of the flexible display panel effectively, resulting in poor rigidity of the bending portion of the flexible display panel. Therefore, in the case that the foldable display device is bent, the bending portion of the flexible display panel bulges backwards easily, which results in poor flatness of the flexible display panel when the foldable display device returns from the bent state to the flat state. Moreover, as the bending portion of the flexible display panel bulges backwards, the creases between the bending portion and the non-bending portion are serious, and the film layer in the flexible display panel is easy to strip off. Therefore, the flexible display panel as a short service life.

Figure 1:
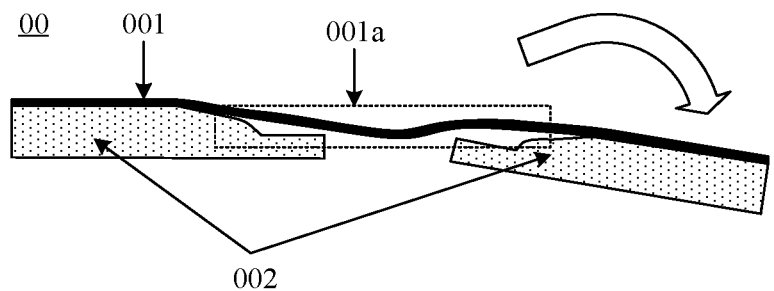
FIG. 1 is a schematic diagram of a foldable display device being outwardly folded in the related art.
Figure 2:
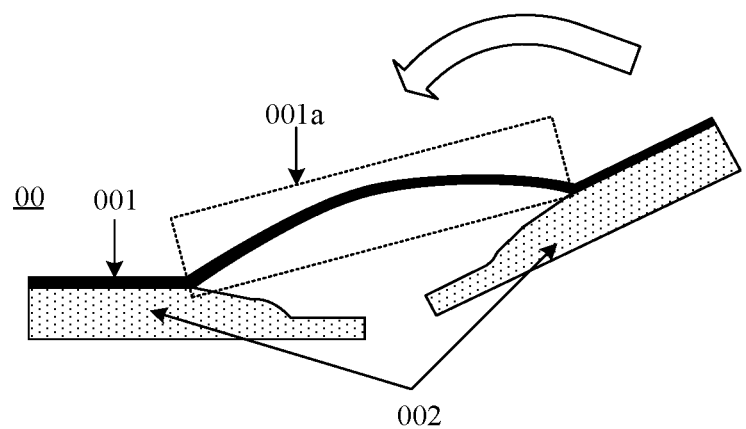
FIG. 2 is a schematic diagram of a foldable display device being inwardly folded in the related art.

Exemplarily, referring to FIG. 1, in the case that the foldable display device 00 is folded outwardly, the bending portion 001a of the flexible display panel 001 bulges towards the side proximal to the support device 002 supporting the flexible display panel 001. Alternatively, referring to FIG. 2, in the case that the foldable display device 00 is folded inwardly, the bending portion 001a of the flexible display panel 001 bulges towards the side distal from the support device 002 supporting the flexible display panel 001.

After the foldable display device 00 is folded outwardly, the flexible display panel 001 is disposed at the outer side relative to the support device 002. That is, the display surface of the flexible display panel 001 is disposed at the outer side. After the foldable display device is folded inwardly, the flexible display panel 001 is disposed at the inner side relative to the support device 002. That is, the display surface of the flexible display panel 001 is disposed at the inner side.

Figure 3:
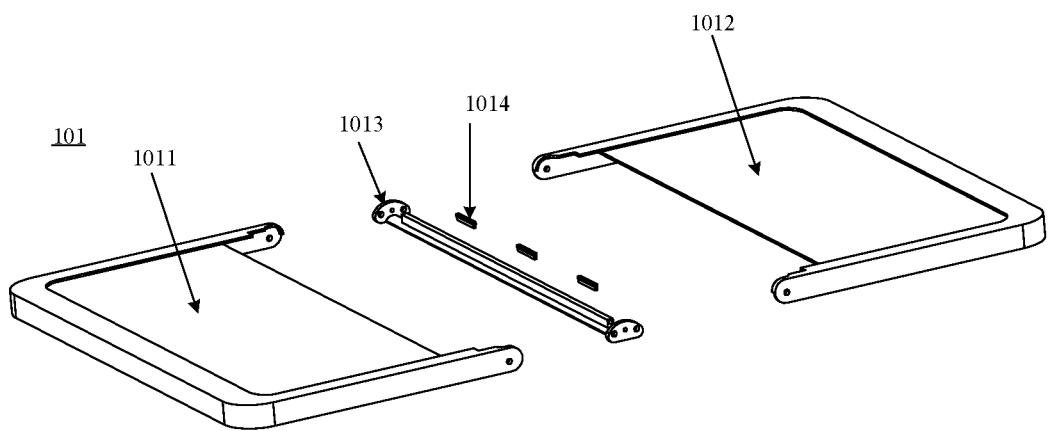
FIG. 3 is a schematic structural diagram of a support device according to embodiments of the present disclosure.
Figure 4:
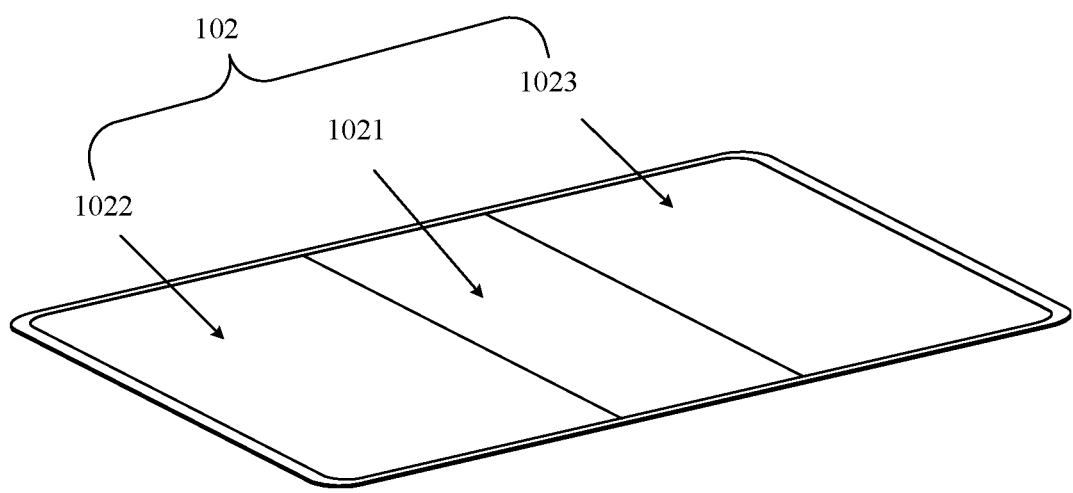
FIG. 4 is a schematic structural diagram of a bendable structure according to embodiments of the present disclosure.

FIG. 3 is a schematic structural diagram of a support device according to embodiments of the present disclosure. The support device 101 may be arranged on the back side of the bendable structure (not shown in FIG. 3) to support the bendable structure. Here, the bendable structure may be a flexible display panel. Referring to FIG. 4, the bendable structure 102 may include a bending portion 1021, and a first non-bending portion 1022 and a second non-bending portion 1023 which are disposed on two sides of the bending portion 1021, respectively.

Referring to FIG. 3, the support device 101 may include a first support 1011, a second support 1012, a rotating shaft support 1013, and at least one support component 1014. Exemplarily, FIG. 3 shows three support components 1014.

The first support 1011 may be configured to be connected to the first non-bending portion 1022 of the bendable structure 102 for supporting the first non-bending portion 1022. The second support 1012 may be configured to be connected to the second non-bending portion 1023 of the bendable structure 102 for supporting the second non-bending portion 1023. The rotating shaft support 1013 may be disposed between the first support 1011 and the second support 1012, and is rotatably connected to the first support 1011 and the second support 1012. Each support component 1014 may be connected to the rotating shaft support 1013, and connected to the bending portion 1021. Each support component 1014 may be configured to support the bending portion 1021 of the bendable structure 102.

In the case that the bendable structure 102 is supported by the support device 101 according to the embodiments of the present disclosure, because the rotating shaft support 1013 is rotatably connected to the first support 1011 and the second support 1012, the first support 1011 can drive the first non-bending portion 1022 to rotate relative to the bending portion 1021, and the second support 1012 can drive the second non-bending portion 1023 to rotate relative to the bending portion 1021, thereby folding the foldable device.

Moreover, in the case that the foldable device is folded, since the support component 1014 in the support device 101 can support the bending portion 1021 of the bendable structure 102 so as to provide support for the bending portion 1021, the bending portion 1021 can be prevented from bulging, thereby ensuring the flatness of the bendable structure 102.

In the embodiments of the present disclosure, the bendable structure 102 may be a flexible display panel. The support device 101 is disposed on the back side of the flexible display panel such that the support device 101 can support the flexible display panel 102. Moreover, in the case that the bendable structure 102 is a flexible display panel, the foldable device may be a foldable display device. Since the support device 101 is capable of supporting all regions of the flexible display panel 102, the bending portion 1021 of the flexible display panel 102 can be prevented from bulging when the foldable display device consisting of the flexible display panel 102 and the support device 101 is folded. In addition, the flexible display panel 102 has a good flatness when the foldable display device returns from the bent state to the flat state. Certainly, the bendable structure 102 may also be other bendable structures. For example, the bendable structure 102 may be a flexible plate structure, which is not limited in the embodiments of the present disclosure.

In summary, the embodiments of the present application provide a support device. The rotating shaft support and each support component in the support device can provide support for the bending portion of the bendable structure. Moreover, the first support in the support device can provide support for the first non-bending portion of the bendable structure, and the second support in the support device can provide support for the second non-bending portion of the bendable structure. That is, the support device according to the embodiments of the present disclosure can be configured to support the entire bendable structure, which can prevent the bending portion of the bendable structure from bulging, thereby ensuring the flatness of the bendable structure.

Figure 5:
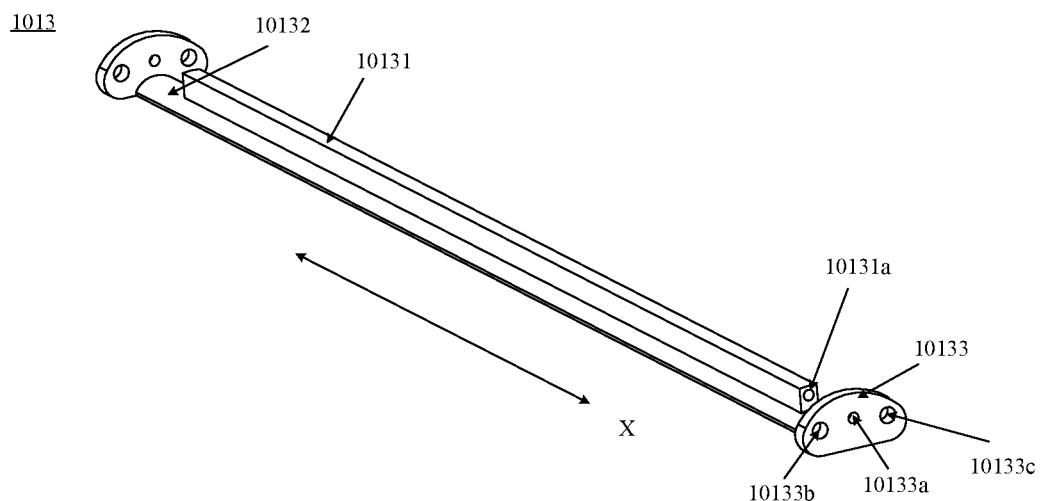
FIG. 5 is a schematic structural diagram of a rotating shaft support according to embodiments of the present disclosure.

FIG. 5 is a schematic structural diagram of a rotating shaft support according to the embodiments of the present disclosure. Referring to FIG. 5, the rotating shaft support 1013 may include a strip-shaped support beam 10131, and a strip-shaped rotating shaft. The support beam 10131 may have a rotating shaft hole 10131a penetrating through the support beam 10131, and an axis of the rotating shaft hole 10131a may be parallel to an extending direction X of the support beam 10131. The rotating shaft may be disposed in the rotating shaft hole 10131a, and is capable of rotating in the rotating shaft hole 10131a, such that the rotating shaft support 1013 rotates relative to the first support 1011 and the second support 1012. In order to clearly illustrate the rotating shaft hole 10131a in the support beam 10131, the rotating shaft is not shown in FIG. 5.

Optionally, referring to FIG. 5, the cross section of the support beam 10131 may be rectangular, and the cross section may be perpendicular to the extending direction X of the support beam 10131. Certainly, the cross section of the support beam 10131 may also be of other shapes, for example, may be circular, which is not limited in the embodiments of the present disclosure.

Figure 6:
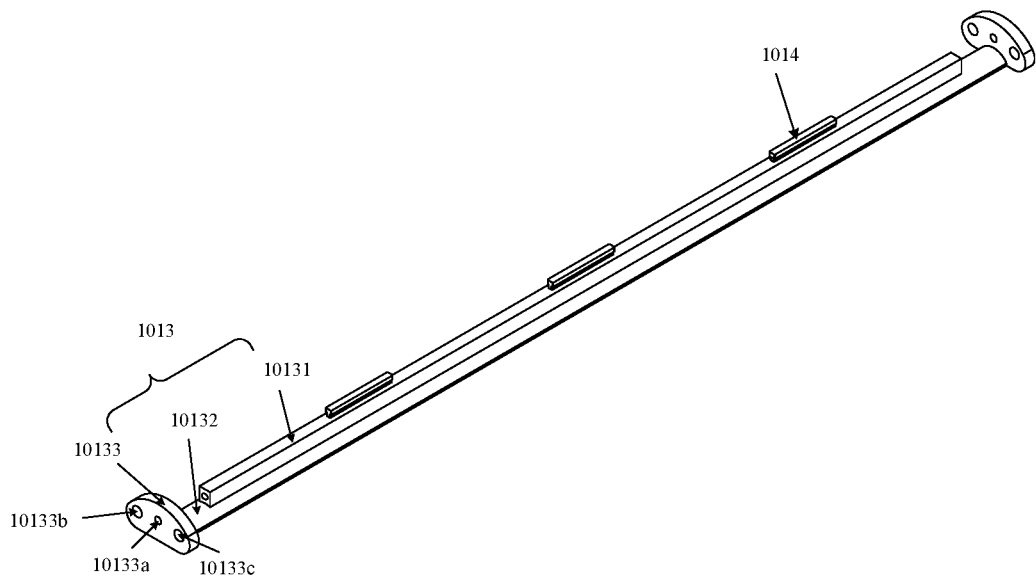
FIG. 6 is a schematic structural diagram of a support beam and a support component according to embodiments of the present disclosure.
Figure 7:
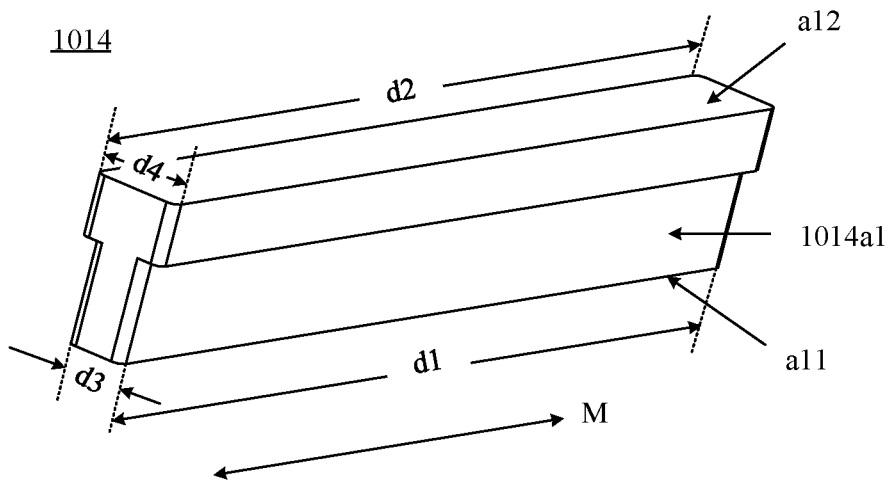
FIG. 7 is a schematic structural diagram of a support component according to embodiments of the present disclosure.

As an optional implementation, FIG. 6 is a schematic structural diagram of a support beam and a support component according to the embodiments of the present disclosure; and FIG. 7 is a schematic structural diagram of a support component according to the embodiments of the present disclosure. In combination with FIG. 6 and FIG. 7, the support component 1014 may include a strip-shaped support bar 1014a1. One end a11 of the support bar 1014a1 may be bonded to the support beam 10131, and the other end a12 of the support bar 1014a1 may be fixedly connected to the bending portion 1021.

Optionally, FIG. 6 shows three support components 1014. Certainly, the support device 101 according to the embodiments of the present disclosure may include more support components 1014, and may for example include four or five support components 1014. The number of the support components 1014 in the support device 101 is not limited in the embodiments of the present disclosure. The greater the number of the support components 1014 in the support device 101 is, the higher the reliability of supporting the bending portion 1021 of the bendable structure 102 by the support device 101 is.

Optionally, the other end a12 of the support bar 1014a1 may be configured to be bonded to the bending portion 1021, or configured to be clamped with the bending portion 1021, which is not limited in the embodiments of the present disclosure as long as reliability of the connection between the other end a12 of the support bar 1014a1 and the bending portion 1021 can be ensured.

Figure 8:
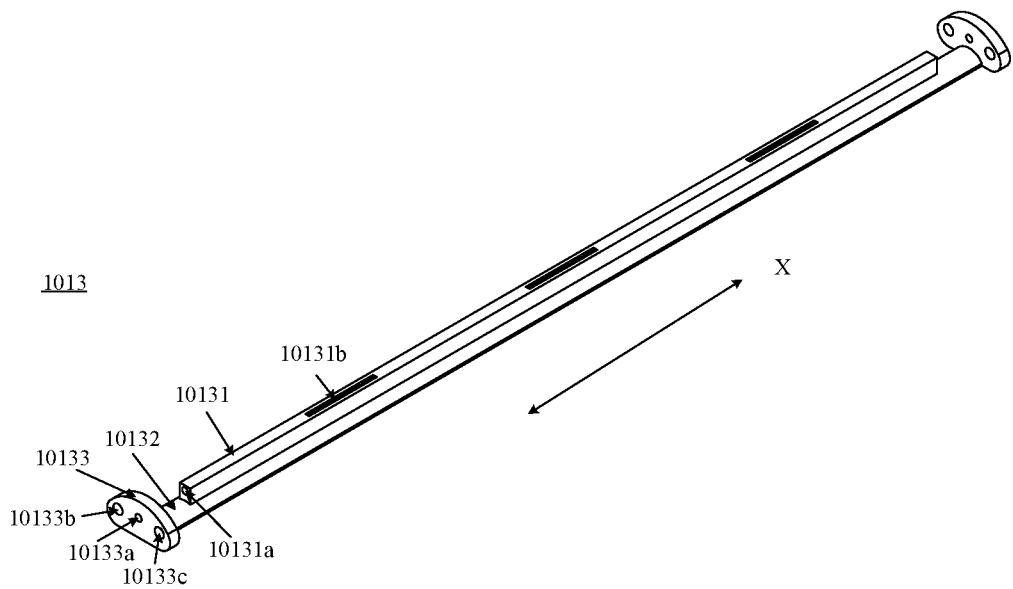
FIG. 8 is a schematic structural diagram of another rotating shaft support according to embodiments of the present disclosure.

FIG. 8 is a schematic structural diagram of another rotating shaft support according to the embodiments of the present disclosure. With reference to FIG. 8, the support beam 10131 may be provided with at least one first groove 10131b. One end a11 of each support bar 1014a1 may be disposed in one first groove 10131b and be bonded to first groove 10131b. By forming the first groove 10131b in the support beam 10131, the support bar 1014a1 is bonded to the bottom surface of the first groove 10131b, such that the support bar 1014a1 can be prevented from shaking relative to the support beam 10131, thereby ensuring the reliability of the connection between the support bar 1014a1 and the support beam 10131.

Optionally, the depth of the first groove 10131b may range from 0.4 mm to 0.8 mm, and the length of the support bar 1014a1 may range from 1.2 mm to 1.8 mm.

Optionally, the number of the first grooves 10131b in the support beam 10131 may be equal to the number of the support components 1014. For example, three support components 1014 are shown in FIG. 6, and correspondingly three first grooves 10131b are shown in FIG. 8. Alternatively, the number of the first grooves 10131b in the support beam 10131 may also be greater than the number of the support components 1014. Under this case, at least one of the first grooves 10131b in the support beam 10131 is not provided with the support bar 1014a1.

In the embodiments of the present disclosure, the orthographic projection of the end a11 of the support bar 1014a1 on the support beam 10131 may be within the orthographic projection of the other end a12 of the support bar 1014a1 on the support beam 10131. Referring to FIG. 7, the length d1 of the end a11 of the support bar 1014a1 in the extending direction M of the support bar 1014a1 is equal to the length d2 of the other end a12 of the support bar 1014a1 in the extending direction M of the support bar 1014a1. The length d3 of the end a11 of the support bar 1014a1 in the direction perpendicular to the extending direction M of the support bar 1014a1 may be less than the length d4 of the other end a12 of the support bar 1014a1 in the direction perpendicular to the extending direction M of the support bar 1014a1. In this way, the orthographic projection of the other end a12 of the support bar 1014a1 on the support beam 10131 may have a bigger area than the orthographic projection of the end a11 of the support bar 1014a1 on the support beam 10131.

Optionally, the length of the first groove 10131b in the direction perpendicular to the extending direction X of the support beam 10131 (i.e., the width of the first groove 10131b) may be less than the length of the support beam 10131 in the direction perpendicular to the extending direction X of the support beam 10131 (i.e., the width of the support beam 10131). Moreover, in order that the end a11 of the support bar 1014a1 is disposed in the first groove 10131b, the length d3 of the end a11 of the support bar 1014a1 needs to be less than or equal to the width of the first groove 10131b. Since the support beam 10131 generally has a small width, the first groove 10131b in the support beam 10131 also has a small width, such that the length d3 of the end a11 of the support bar 1014a1 also needs to be small.

Additionally, since the length d4 of the other end a12 of the support bar 1014a1 in the direction perpendicular to the extending direction M of the support bar 1014a1 is relatively large, the contact area between the other end a12 of the support bar 1014a1 and the bendable structure 102 can be increased, which can ensure the reliability of the connection between the support bar 1014a1 and the bendable structure 102.

Optionally, referring to FIG. 7, the cross section of the support bar 1014a1 may be T-shaped. The cross section may be perpendicular to the extending direction M of the support bar 1014a1. The smaller-sized end of the I-shape (i.e., the end a11 of the support bar 1014a1) may be bonded to the support beam 10131, and the larger-sized end (i.e., the other end a12 of the support bar 1014a1) may be configured to be fixedly connected to the bendable structure 102.

Figure 9:
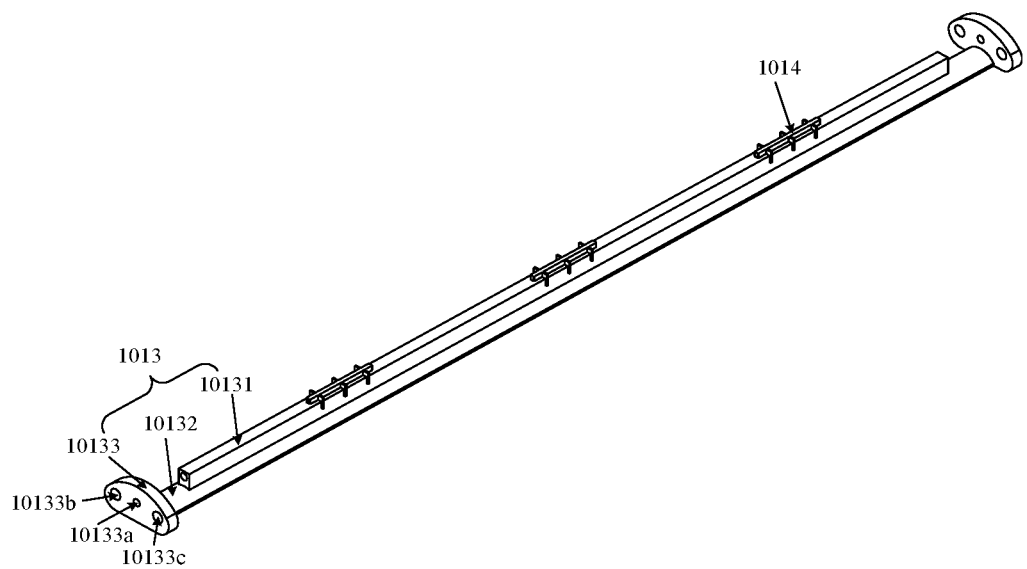
FIG. 9 is a schematic structural diagram of another support beam and support component according to embodiments of the present disclosure.
Figure 10:
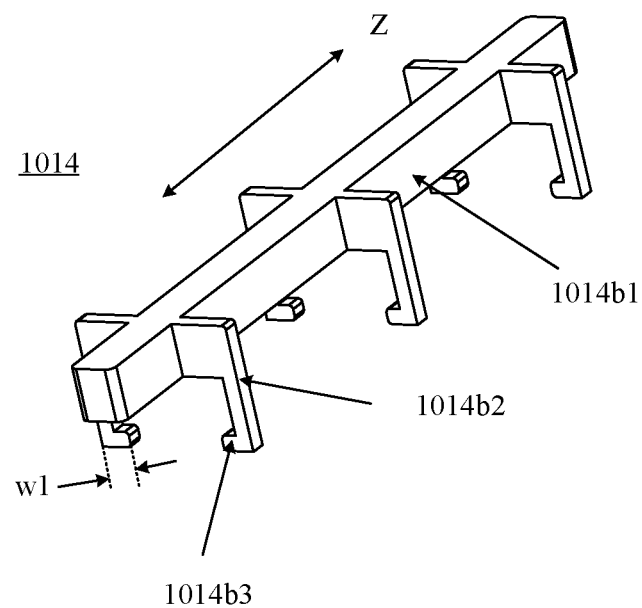
FIG. 10 is a schematic structural diagram of another support component according to embodiments of the present disclosure.

As another optional implementation, FIG. 9 is a schematic structural diagram of another support beam and support component according to the embodiments of the present disclosure; and FIG. 10 is a schematic structural diagram of another support component according to the embodiments of the present disclosure. In combination with FIG. 9 and FIG. 10, each support component 1014 may include: a strip-shaped support bar 1014b1, and a plurality of connectors 1014b2. Each of the connectors 1014b2 may be bent-shaped. One end of each connector 1014b2 may be fixedly connected to the support bar 1014b1, and the other end may be connected to the support beam 10131. For example, one end of the connector 1014b2 may be bonded to the support bar 1014b1, and the other end of the connector 1014b2 may be bonded to the support beam 10131.

In the embodiments of the present disclosure, at least two of the plurality of connectors 1014b2 may be disposed on different sides of the support bar 1014b1. Since at least two of the connectors 1014b2 are disposed on different sides of the support bar 1014b1, the at least two connectors 1014b2 may respectively connect different sides of the support bar 1014b1 to the support beam 10131, thereby ensuring the stability of the connection between the support component 1014 and the support beam 10131.

Optionally, FIG. 9 shows three support components 1014. Certainly, the support device 101 according to the embodiments of the present disclosure may also include more support components 1014. For example, the support device 101 may include four or five support components 1014. The number of the support components 1014 in the support device 101 is not limited in the embodiments of the present disclosure. The greater the number of the support components 1014 in the support device 101 is, the higher the reliability of supporting the bending portion 1021 of the bendable structure 102 by the support device 101 is.

Additionally, the support component 1014 shown in FIG. 10 includes six connectors 1014b2. Three connectors 1014b2 of the six connectors 1014b2 may be disposed on one side of the support bar 1014b1, and the other three connectors 1014b2 may be disposed on the other side of the support bar 1014b1. Certainly, the support component 1014 may also include other numbers of connectors 1014b2, as long as it's ensured that at least two of the connectors 1014b2 are disposed on different sides of the support bar 1014b1.

Figure 11:
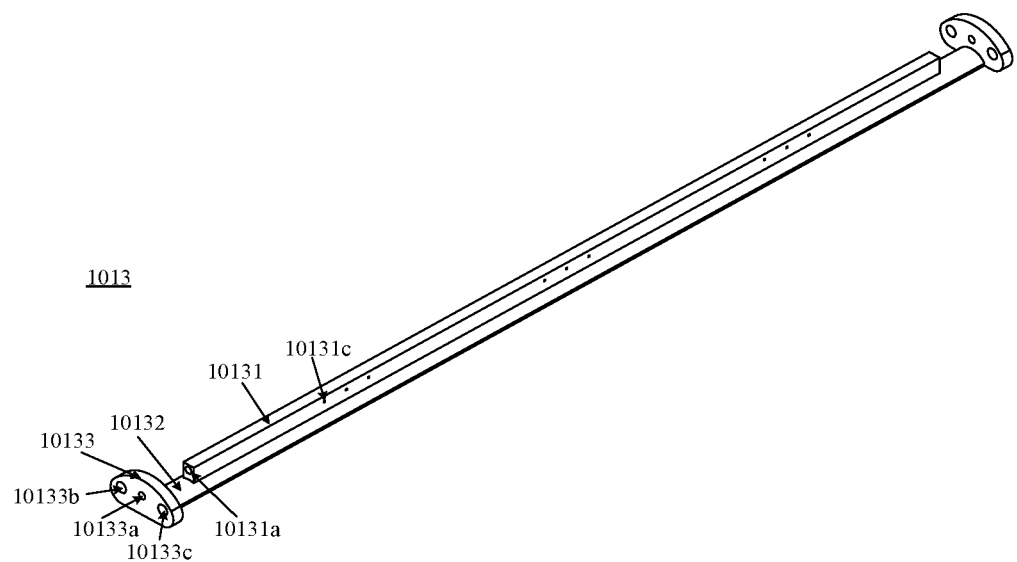
FIG. 11 is a schematic structural diagram of still another rotating shaft support according to embodiments of the present disclosure.
Figure 12:
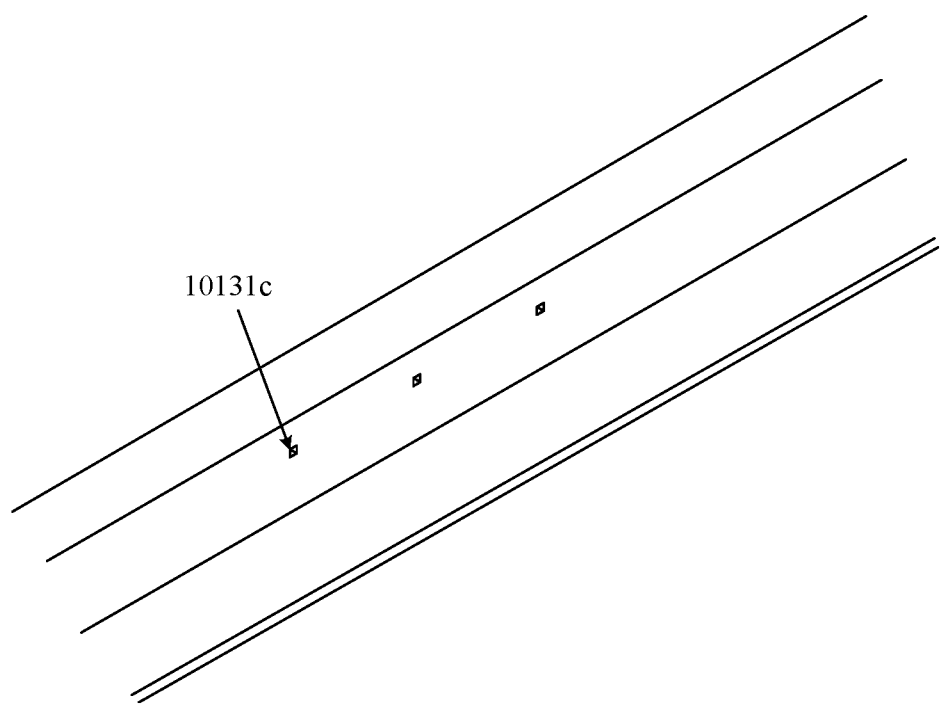
FIG. 12 is a schematic diagram of a partial structure of the rotating shaft support shown in FIG. 11.

FIG. 11 is a schematic structural diagram of still another rotating shaft support according to the embodiments of the present disclosure; and FIG. 12 is a schematic diagram of a partial structure of the rotating shaft support shown in FIG. 11. Referring to FIGS. 11 and 12, the support beam 10131 may be provided with a plurality of second grooves 10131c. Referring to FIG. 10, each support component 1014 further includes a first protruding structure 1014b3 connected to the other end of the connector 1014b2. The first protruding structure 1014b3 may be disposed within one second grooves 10131c. That is, the second groove 10131c is formed in the support beam 10131 so as to connect the support beam 10131 and the support component 1014.

Optionally, the length w1 of the first protruding structure 1014b3 in the direction perpendicular to the extending direction Z of the support bar 1014b1 ranges from 0.1 mm to 0.5 mm. Moreover, the orthographic projection of the second groove 10131c on the support beam 1013 may be greater than or equal to the size of the first protruding structure 1014b3. For example, the difference between the length of each side of the orthographic projection of the second groove 10131c on the support beam 1013 and the length of the first protruding structure 1014b3 is 0.1 mm.

Referring to FIG. 11, nine second grooves 10131c may be formed on one side of the support beam 10131, and nine second grooves 10131c may also be formed on the other side of the support beam 10131. The number of the second grooves 1013c in the support beam 10131 may be equal to the number of the connectors 1014b2 of the support component 1014. Certainly, the number of the second grooves 1013c in the support beam 10131 may also be greater than the number of the connectors 1014b2 of the support component 1014, which is not limited in the embodiments of the present disclosure.

Optionally, the support bar 1014b1, the plurality of connectors 1014b2, and the first protruding structures 1014b3 may be of an integral structure. For example, the support bar 1014b1, the plurality of connectors 1014b2, and the first protruding structures 1014b3 may be manufactured by the same manufacturing process.

In the embodiments of the present disclosure, the support bar 1014b1 is further configured to be fixedly connected to the bending portion 1021 of the bendable structure 102. For example, the support bar 1014b1 may be configured to be bonded to the bending portion 1021, or may be configured to be clamped with the bending portion 1021. The way of connection method between the support bar 1014b1 and the bending portion 1021 is not limited in the embodiments of the present disclosure as long as the reliability of the connection between the support bar 1014b1 and the bending portion 1021 can be ensured.

In the embodiments of the present disclosure, the first protruding structure 1014b3 of the support component 1014 may be clamped into the second groove 10131c in the support beam 10131, so as to achieve the fixed connection between the support component 1014 and the support beam 10131. In addition, since the length w1 of the first protruding structure 1014b3 is small, the support component 1014 may be directly pulled out of the second groove 10131c when the support component 1014 is removed from the support beam 10131.

Figure 13:
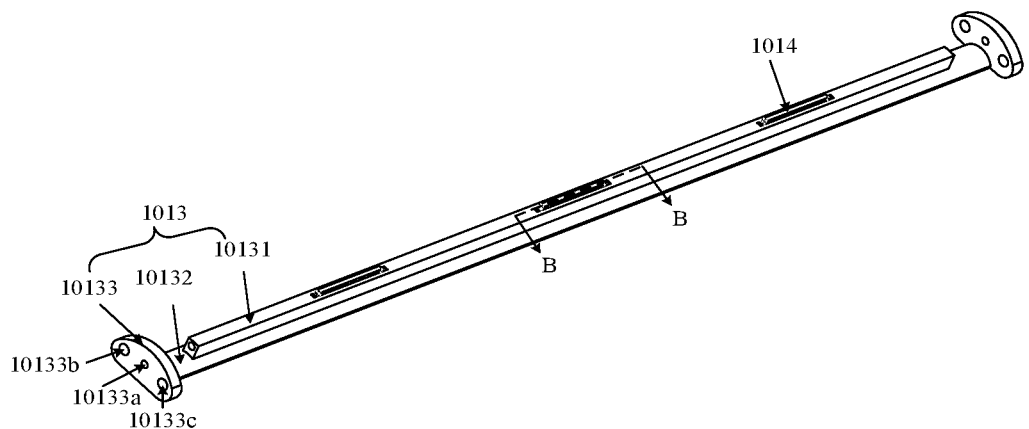
FIG. 13 is a schematic structural diagram of still another support beam and support component according to embodiments of the present disclosure.
Figure 14:
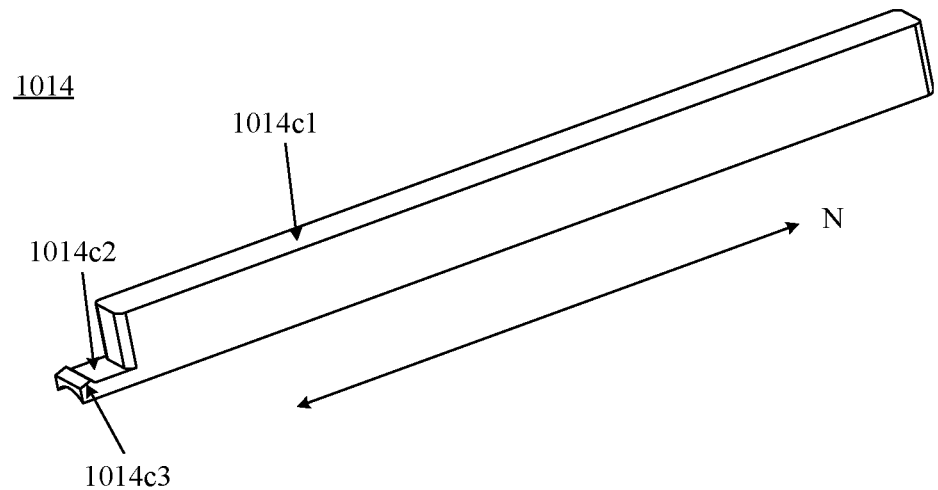
FIG. 14 is a schematic structural diagram of still another support component according to embodiments of the present disclosure.

As another optional implementation, FIG. 13 is a schematic structural diagram of still another support beam and support component according to the embodiments of the present disclosure, and FIG. 14 is a schematic structural diagram of still another support component according to the embodiments of the present disclosure. In conjunction with FIGS. 13 and 14, each support component 1014 may include: a strip-shaped support bar 1014c1, a sheet structure 1014c2 connected to a side of the support bar 1014c1, and a second protruding structure 1014c3 disposed at the end, distal from the support bar 1014c1, of the sheet structure 1014c2.

Referring to FIG. 14, the surface of the sheet structure 1014c2 which is not provided with the second protruding structure 1014c3 may be coplanar with one surface of the support bar 1014c1. Certainly, the surface of the sheet structure 1014c2 which is not provided with the second protruding structure 1014c3 may also be not coplanar with one surface of the support bar 1014c1, which is not limited in the embodiments of the present disclosure.

Figure 15:
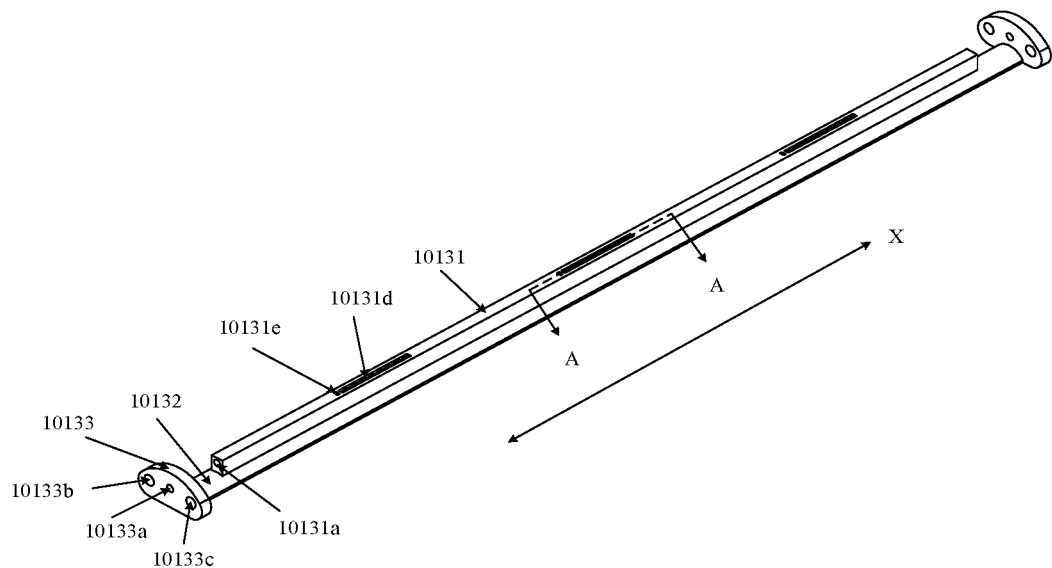
FIG. 15 is a schematic structural diagram of yet another rotating shaft support according to embodiments of the present disclosure.
Figure 16:
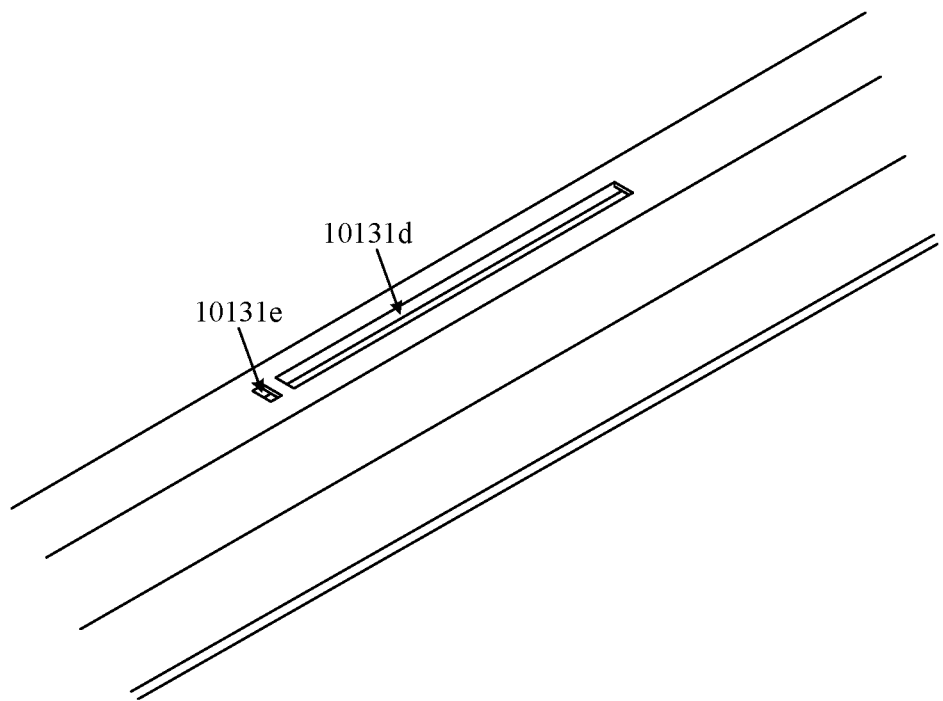
FIG. 16 is a schematic diagram of a partial structure of the support beam in the rotating shaft support shown in FIG. 15.
Figure 17:
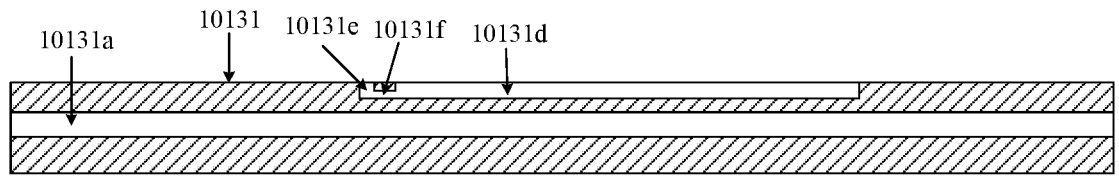
FIG. 17 is a sectional view of the support beam in the rotating shaft support shown in FIG. 15 along an AA direction.

FIG. 15 is a schematic structural diagram of yet another rotating shaft support according to the embodiments of the present disclosure, FIG. 16 is a schematic diagram of a partial structure of the support beam in the rotating shaft support shown in FIG. 15, and FIG. 17 is a sectional view of the support beam in the rotating shaft support shown in FIG. 15 along the AA direction. In conjunction with FIGS. 15 to 17, the support beam 10131 may be provided with a third groove 10131d, a fourth groove 10131e, and a communication groove 10131f for communicating the third groove 10131d and the fourth groove 10131e inside the support beam 10131.

Figure 18:
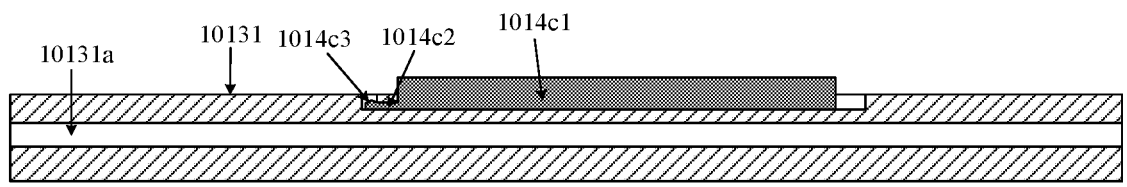
FIG. 18 is a sectional view of the support beam and support component shown in FIG. 13 along a BB direction.

FIG. 18 is a sectional view of the support beam and support component shown in FIG. 13 along the BB direction. Referring to FIG. 18, the support bar 1014c1 may be provided in the third groove 10131d, the second protruding structure 1014c3 may be provided in the fourth groove 10131e, and the sheet structure 1014c2 may be provided in the communication groove 10131f, thereby connecting the support component 1014 to the support beam 10131.

The support bar 1014c1 may also be configured to be fixedly connected to the bending portion 1021 of the bendable structure 102. For example, the support bar 1014c1 may be configured to be bonded to the bending portion 1021, or may be configured to be clamped with the bending portion 1021. The way of connection between the support bar 1014c1 and the bending portion 1021 is not limited in the embodiments of the present disclosure as long as the reliability of the connection between the support bar 1014c1 and the bending portion 1021 can be ensured.

In the embodiments of the present disclosure, the support component 1014 may be mounted laterally on the support beam 10131. The support component 1014 is placed in the third groove 10131d of the support beam 10131 first, and then a force is applied laterally to insert the second protruding structure 1014c3 of the support component 1014 into the fourth groove 10131e via the communication groove 10131f When the support component 1014 is removed from the support beam 10131, the second protruding structure 1014c3 may be pushed out of the fourth groove 10131e first, and then the support component 1014 is taken out of the third groove 10131d.

The support component 1014 needs to be placed into or taken out of the third groove 10131d when the support component 1014 is mounted on or removed from the support beam 10131. Therefore, the length of the third groove 10131d along the extending direction X of the support beam 10131 needs to be greater than the total length of the support bar 1014c1 and sheet structure 1014c2 of the support component 1014 along the extending direction N of the support bar 1014c1.

In the embodiments of the present disclosure, the support beam 10131 is provided with a rotating shaft hole 10131a. Thus, the bottom surface of the third groove 10131d and the bottom surface of the fourth groove 10131e are both arc surfaces, so as to prevent the rotating shaft in the rotating shaft hole 10131a from interacting with the support component 1014 in the third groove 10131d, the fourth groove 10131e and the communication groove 10131f, and ensure the reliability of the support device 101. Therefore, in order to connect the support component 1014 to the support beam 10131, both the surface of the support bar 1014c1 proximal to the support beam 10131 and the surface of the sheet structure 1014c2 proximal to the support beam 10131 need to be arc surfaces to match the shape of the third groove 10131*d* and the shape of the fourth groove 10131*e*.

The are surface may be protruded towards the bendable structure 102, and the radius of the are surface may be greater than the radius of the rotating shaft hole 10131*a*, so as to prevent the third groove 10131*d* and the fourth groove 10131*e* from communicating with the rotating shaft hole 10131*a*.

Referring to FIGS. 5, 6, 8, 9, 11, 13, and 15, the rotating shaft support 1013 may further include a strip-shaped support structure 10132 connected to the support beam 10131, and two plate-shaped connecting structures 10133. The two connecting structures 10133 may be connected to two ends of the support structure 10132, respectively.

The support structure 10132 provided in the rotating shaft support 1013 can support the support beam 10131, to improve the rigidity of the rotating shaft support 1013 and avoid damages to the rotating shaft support 1013, thereby ensuring the reliability of supporting the bending portion 1021 of the bendable structure 102 by the rotating shaft support 1013.

Referring to FIGS. 5, 6, 8, 9, 11, 13, and 15, each connecting structure 10133 may at least be provided with a first through hole 10133*a*, and a second through hole 10133*b* and a third through hole 10133*c* which are disposed on two sides of the first through hole 10133*a*, respectively. The axis of the first through hole 10133*a* may be co-linear with the axis of the rotating shaft hole 10131*a* in the support beam 10131, and the first through hole 10133*a* may be connected to the rotating shaft. The second through hole 10133*b* may be connected to the first support 1011, and the third through hole 10133*c* may be connected to the second support 1012.

In the case that the rotating shaft is mounted to the support beam 10131, the rotating shaft may sequentially pass through the first through hole 10133*a* in one of the two connecting structures 10133, the rotating shaft hole 10131*a*, and the first through hole 10133*a* of the other one of the two connecting structures 10133. Moreover, the rotating shaft support 1013 is connected to the first support 1011 through the second through hole 10133*b* in the connecting structure 10133 of the rotating shaft support 1013, such that the rotating shaft support 1013 rotates relative to the first support 1011. The rotating shaft support 1013 is connected to the second support 1012 through the third through hole 10133*c* in the connecting structure 10133 of the rotating shaft support 1013, such that the rotating shaft support 1013 rotates relative to the second support 1012.

Figure 19:
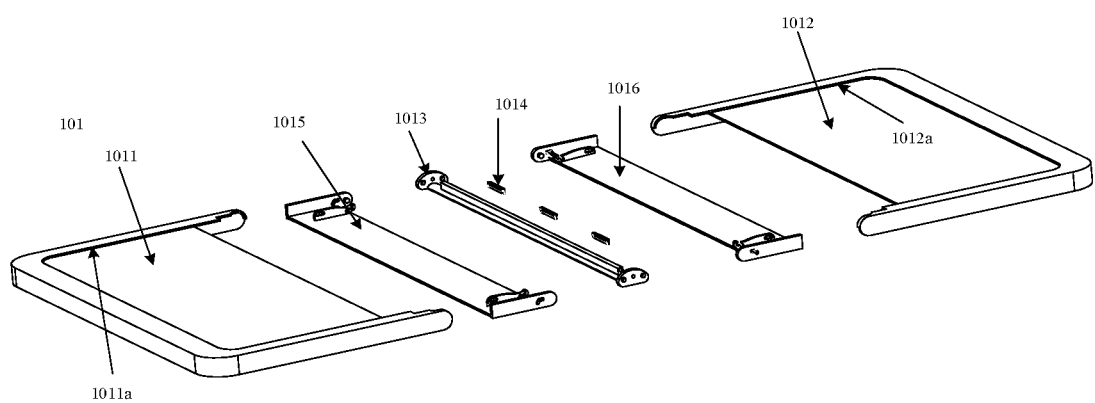
FIG. 19 is a schematic structural diagram of another support device according to embodiments of the present disclosure.

FIG. 19 is a schematic structural diagram of another support device according to the embodiments of the present disclosure. Referring to FIG. 19, the support device 101 may further include a first bracket 1015 and a second bracket 1016. One end of the first bracket 1015 may be rotatably connected to the rotating shaft support 1013, and the other end of the first bracket 1015 may be fixedly connected to the first support 1011. One end of the second bracket 1016 may be rotatably connected to the rotating shaft support 1013, and the other end of the second bracket 1016 may be fixedly connected to the second support 1012. That is, the rotating shaft support 1013 may be rotatably connected to the first support 1011 through the first bracket 1015 and rotatably connected to the second support 1012 through the second bracket 1016.

Optionally, the first bracket 1015 may be rotatably connected to the rotating shaft support 1013 by gears or hinges, and the second bracket 1016 may be rotatably connected to the rotating shaft support 1013 by gears or hinges. The first bracket 1015 and the second bracket 1016 may be connected to the rotating shaft support 1013 in the same manner or in different manners, which is not limited in the embodiments of the present disclosure.

Referring to FIG. 19, it can be seen that the first support 1011 and the second support 1012 may both be plate-shaped structures, and the first support 1011 may be provided with a first slot 1011*a* and the second support 1012 may be provided with a second slot 1012*a*. The bendable structure 102 may be disposed in the first slot 1011*a* and the second slot 1012*a*, and the first slot 1011*a* and the second slot 1012*a* may be configured to protect the sides of the bendable structure 102 to avoid damages to the sides of the bendable structure 102.

In summary, the embodiments of the present application provide a support device. The rotating shaft support and each support component in the support device can provide support for the bending portion of the bendable structure. Moreover, the first support in the support device can provide support for the first non-bending portion of the bendable structure, and the second support in the support device can provide support for the second non-bending portion of the bendable structure. That is, the support device according to the embodiments of the present disclosure can be configured to support the entire bendable structure, which can prevent the bending portion of the bendable structure from bulging, thereby ensuring the flatness of the bendable structure.

Figure 20:
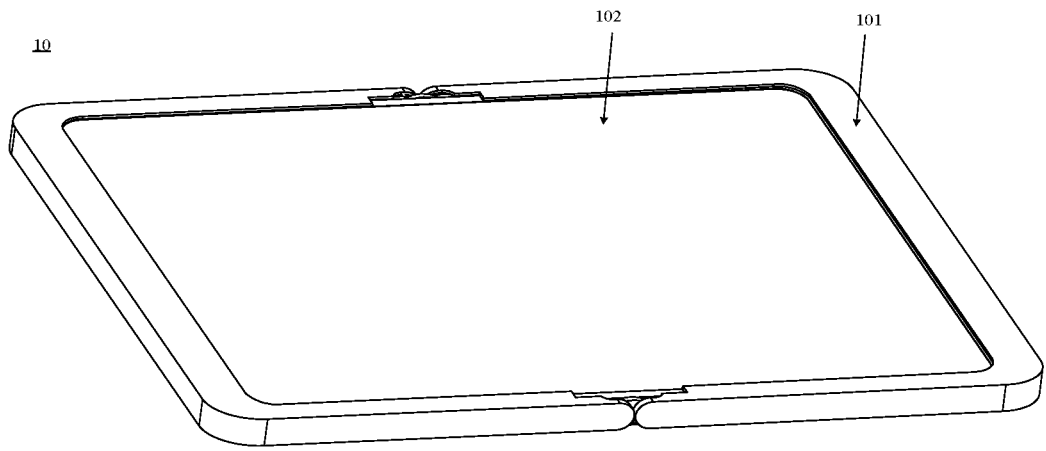
FIG. 20 is a schematic structural diagram of a foldable device according to embodiments of the present disclosure.
Figure 21:
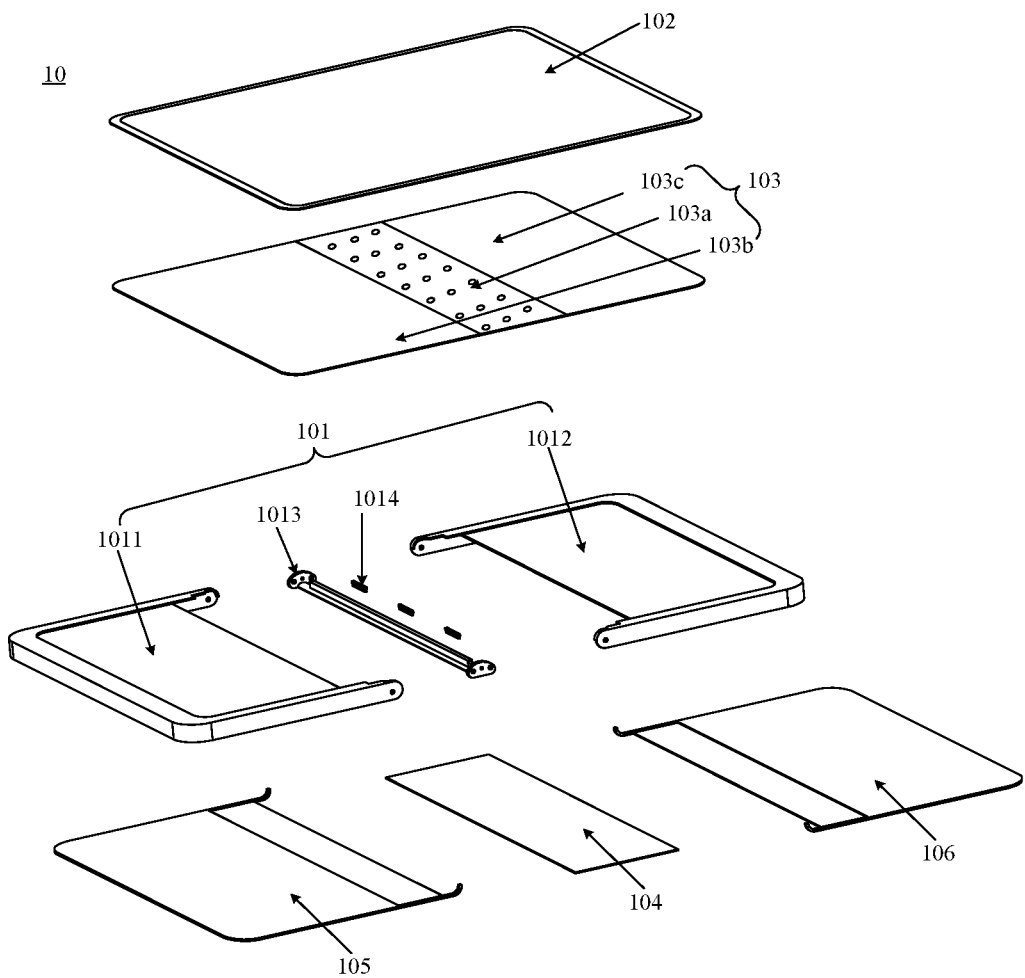
FIG. 21 is an exploded schematic diagram of the foldable device shown in FIG. 20.

FIG. 20 is a schematic structural diagram of a foldable device according to the embodiments of the present disclosure, and FIG. 21 is an exploded schematic diagram of the foldable device shown in FIG. 20. Referring to FIGS. 20 and 21, the foldable device 10 may include: a bendable structure 102 and the support device 101 as provided in the aforesaid embodiments. The support device 101 may be disposed on the back side of the bendable structure 102, and the support device 101 is connected to the hack side of the bendable structure 102.

The support device 101 may be configured to support the entire bendable structure 102, which can prevent the bending portion 1021 of the bendable structure 102 from bulging, thereby ensuring the flatness of the bendable structure 102. In addition, since the support component 1014 in the support device 101 is connected to the bending portion 1021 of the bendable structure 102, the bendable structure 102 can be prevented from sliding relative to other devices in the bending process of the foldable device 10, thereby ensuring the stability of the foldable device 10.

Optionally, the bendable structure 102 may be a flexible display panel. Accordingly, the foldable device 10 may be a foldable display device. Certainly, the bendable structure 102 may also be other bendable structures, which is not limited in the embodiments of the present disclosure.

Referring to FIG. 21, the foldable device 10 may further include a reinforcement plate 103. The support device 101 and the bendable structure 102 may be connected by the reinforcement plate 103.

Optionally, the reinforcement plate 103 may include: a bending region 103*a* and a first non-bending region 103*b* and a second non-bending region 103*c* disposed on two sides of the bending region 103*a*, respectively. The bending region 103*a* may be connected to the bending portion 102 of the bendable structure 102, the first non-bending region 103*b* may be connected to the first non-bending portion 1022 of the bendable structure 102, and the second non-bending region 103*c* may be connected to the second non-bending portion 1023 of the bendable structure 102.

Furthermore, the bending region 103a of the reinforcement plate 103 is further bonded to the support bar in the support device 101.

In the embodiments of the present disclosure, the reinforcement plate 103 may be made of a metallic material so as to provide reinforcement to the bendable structure 102, thereby improving the strength of the bendable structure 102. Moreover, since the bending region 103a of the reinforcement plate 103 needs to be bent, the bend region 103a may be provided with a plurality of openings (i.e., the bending region may be hollowed out) to reduce the stress in the bending region 103a. In addition, the first non-bending region 103b and the second non-bending region 103c may be sheet-shaped.

Optionally, referring to FIG. 21, the openings in the bending region 103 of the reinforcement plate 103 may be round. Certainly, the openings in the bending region 103 of the reinforcement plate 103 may also be in other shapes, and may for example be rectangular, which is not limited in the embodiments of the present disclosure.

Referring to FIG. 21, the foldable device 10 may further include: a first protective structure 104, a second protective structure 105, and a third protective structure 106. The first protective structure 104 may be disposed on the side, distal from the bendable structure 102, of the rotating shaft support 1013 of the support device 101, and is configured to wrap the rotating shaft support 1013 to avoid damages to the rotating shaft support 1013. The second protective structure 105 may be disposed on the side, distal from the bendable structure 102, of the first support 1011 of the support device 101, and is configured to wrap the first support 1011 to avoid damages to the first support 1011. The third protective structure 106 may be disposed on the side, distal from the bendable structure 102, of the second support 1012 of the support device 101, and is configured to wrap the second support 1012 to avoid damages to the second support 1012.

Optionally, the foldable display device may be any product or component having a display function, such as electronic paper, an organic light-emitting diode (OLED) display device, a mobile phone, a tablet computer, a TV, a display, a notebook computer, a digital photo frame, a navigator, and the like.

In summary, the embodiments of the present disclosure provide a foldable device. The foldable device includes a bendable structure and a support device disposed on the back side of the bendable structure. The rotating shaft support and each support component in the support device can support the bending portion of the bendable structure. Moreover, the first support in the support device can support the first non-bending portion of the bendable structure, and the second support can support the second non-bending portion of the bendable structure. That is, the support device can be configured to support the entire bendable structure, which can prevent the bending portion of the bendable structure from bulging, thereby ensuring the flatness of the bendable structure.

The descriptions above are merely optional embodiments of the present disclosure, and are not intended to limit the present disclosure. Within the spirit and principles of the disclosure, any modifications, equivalent substitutions, improvements, and the like are within the protection scope of the present disclosure.

What is claimed is:

1. A support device, wherein the support device is disposed on a back side of a bendable structure, the bendable structure comprising a bending portion, and a first non-bending portion and a second non-bending portion disposed on two sides of the bending portion, respectively; the support device comprising:
   a first support, configured to be connected to the first non-bending portion;
   a second support, configured to be connected to the second non-bending portion;
   a rotating shaft support, configured to be rotatably connected to the first support and the second support; and
   at least one support component, wherein each support component is connected to the rotating shaft support and configured to be connected to the bending portion;
   wherein the rotating shaft support comprises a strip-shaped support beam and a strip-shaped rotating shaft;
   wherein the support beam is provided with a rotating shaft hole penetrating through the support beam, wherein an axis of the rotating shaft hole is parallel to an extending direction of the support beam; and the rotating shaft is disposed in the rotating shaft hole and is rotatable in the rotating shaft hole; and
   each support component comprises a strip-shaped support bar, a sheet structure connected to a side of the support bar, and a second protruding structure disposed at an end, distal from the support bar, of the sheet structure; the support beam is provided with a third groove, a fourth groove, and a communication groove disposed inside the support beam and configured to communicate the third groove and the fourth groove; wherein the support bar is disposed in the third groove, the second protruding structure is disposed in the fourth groove, and the sheet structure is disposed in the communication groove; and the support bar is further configured to be fixedly connected to the bending portion.

2. The support device according to claim 1, wherein a length of the third groove along the extending direction of the support beam is greater than a total length of the support bar and the sheet structure along an extending direction of the support bar.

3. The support device according to claim 1, wherein a bottom surface of the third groove and a bottom surface of the fourth groove are both arc surfaces, and a surface, proximal to the support beam, of the support bar and a surface, proximal to the support beam, of the sheet structure are both the arc surfaces;
   wherein the arc surfaces are protruded towards the bendable structure, and a radius of the arc surfaces is greater than a radius of the rotating shaft hole.

4. The support device according to claim 1, wherein the rotating shaft support further comprises: a strip-shaped support structure connected to the support beam and two plate-shaped connecting structures, the two connecting structures being connected to two ends of the support structure, respectively; wherein
   each of the connecting structures is at least provided with a first through hole, and a second through hole and a third through hole disposed on two sides of the first through hole respectively, wherein an axis of the first through hole is co-linear with an axis of the rotating shaft hole, the first through hole is connected to the rotating shaft, the second through hole is connected to the first support, and the third through hole is connected to the second support.

5. The support device according to claim 1, further comprising: a first bracket and a second bracket; wherein
   one end of the first bracket is rotatably connected to the rotating shaft support, and another end of the first bracket is fixedly connected to the first support; and one end of the second bracket is rotatably connected to the rotating shaft support, and another end of the second bracket is fixedly connected to the second support.

6. A foldable device, comprising: a bendable structure, and at least one support device; wherein
the support device is disposed on and connected to a back side of the bendable structure, the bendable structure comprising a bending portion, and a first non-bending portion and a second non-bending portion disposed on two sides of the bending portion, respectively; the support device comprising:
a first support, configured to be connected to the first non-bending portion;
a second support, configured to be connected to the second non-bending portion;
a rotating shaft support, configured to be rotatably connected to the first support and the second support; and
at least one support component, wherein each support component is connected to the rotating shaft support and configured to be connected to the bending portion;
wherein the rotating shaft support comprises a strip-shaped support beam and a strip-shaped rotating shaft; wherein the support beam is provided with a rotating shaft hole penetrating through the support beam, wherein an axis of the rotating shaft hole is parallel to an extending direction of the support beam; and the rotating shaft is disposed in the rotating shaft hole and is rotatable in the rotating shaft hole; and
each support component comprises a strip-shaped support bar, a sheet structure connected to a side of the support bar, and a second protruding structure disposed at an end, distal from the support bar, of the sheet structure; the support beam is provided with a third groove, a fourth groove, and a communication groove disposed inside the support beam and configured to communicate the third groove and the fourth groove; wherein the support bar is disposed in the third groove, the second protruding structure is disposed in the fourth groove, and the sheet structure is disposed in the communication groove; and the support bar is further configured to be fixedly connected to the bending portion.

7. The foldable device according to claim 6, wherein the bendable structure is a flexible display panel.

8. The foldable device according to claim 6, further comprising: a reinforcement plate; wherein
the support device and the bendable structure are connected by the reinforcement plate.

9. The foldable device according to claim 6, wherein a length of the third groove along the extending direction of the support beam is greater than a total length of the support bar and the sheet structure along an extending direction of the support bar.

10. The foldable device according to claim 6, wherein a bottom surface of the third groove and a bottom surface of the fourth groove are both arc surfaces, and a surface, proximal to the support beam, of the support bar and a surface, proximal to the support beam, of the sheet structure are both the arc surfaces;
wherein the arc surfaces are protruded towards the bendable structure, and a radius of the arc surfaces is greater than a radius of the rotating shaft hole.

11. The foldable device according to claim 6, wherein the rotating shaft support further comprises: a strip-shaped support structure connected to the support beam and two plate-shaped connecting structures, the two connecting structures being connected to two ends of the support structure, respectively; wherein
each of the connecting structures is at least provided with a first through hole, and a second through hole and a third through hole disposed on two sides of the first through hole respectively, wherein an axis of the first through hole is co-linear with an axis of the rotating shaft hole, the first through hole is connected to the rotating shaft, the second through hole is connected to the first support, and the third through hole is connected to the second support.

12. The foldable device according to claim 6, further comprising: a first bracket and a second bracket; wherein
one end of the first bracket is rotatably connected to the rotating shaft support, and another end of the first bracket is fixedly connected to the first support; and
one end of the second bracket is rotatably connected to the rotating shaft support, and another end of the second bracket is fixedly connected to the second support.

* * * * *